Figure 5:
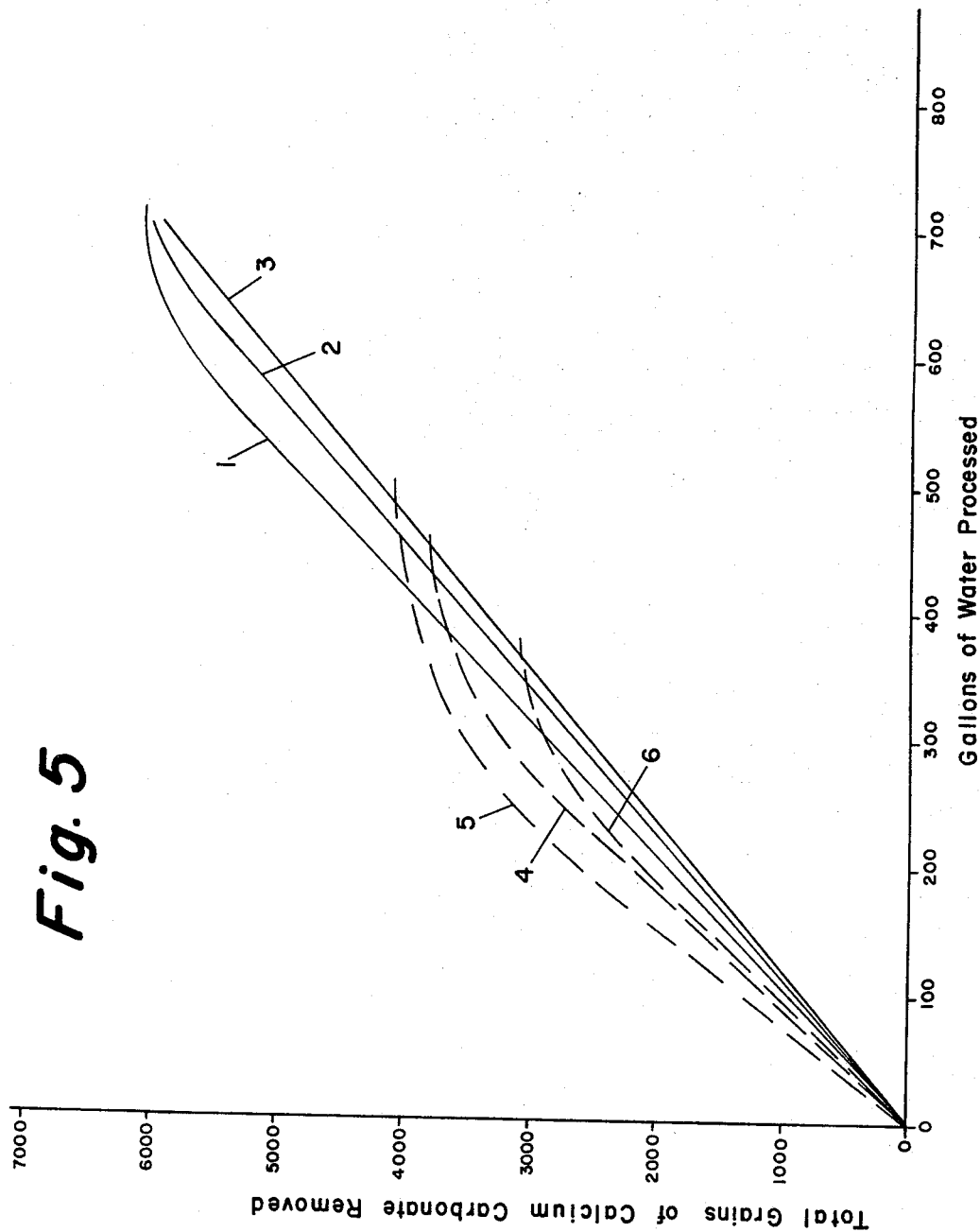

Aug. 20, 1968   R. BARTELL ETAL   3,398,090
ION EXCHANGE WATER TREATMENT USING VIBRATORY AGITATION
Filed Oct. 20, 1965   4 Sheets-Sheet 1
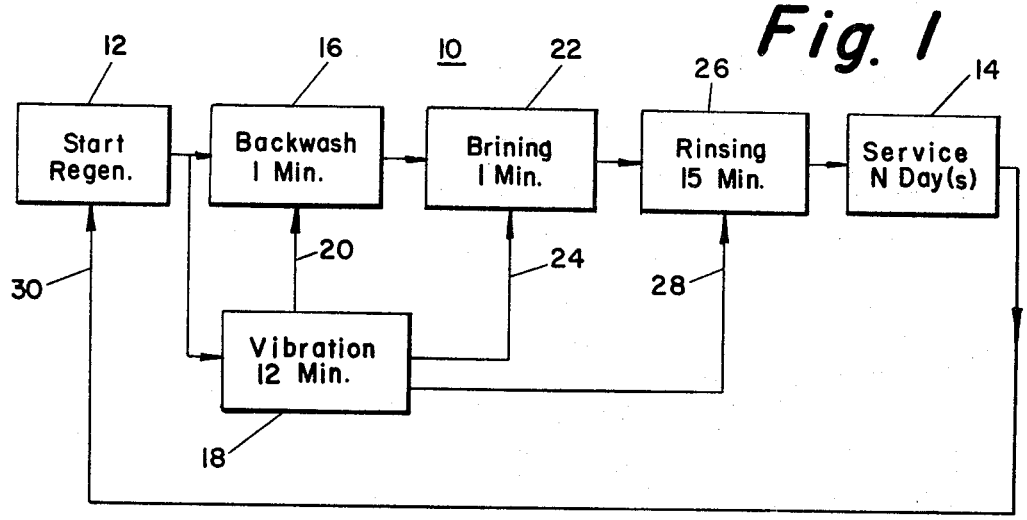
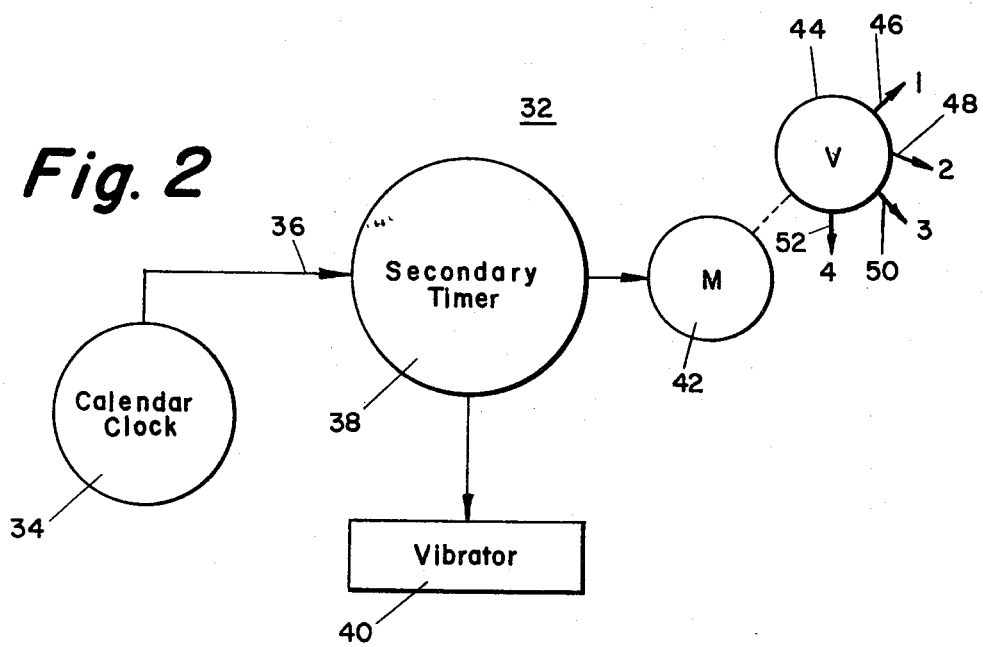
INVENTORS.
RUDY BARTELL
HERBERT A. McKEE
BY Jacob Trachtman
ATTORNEY

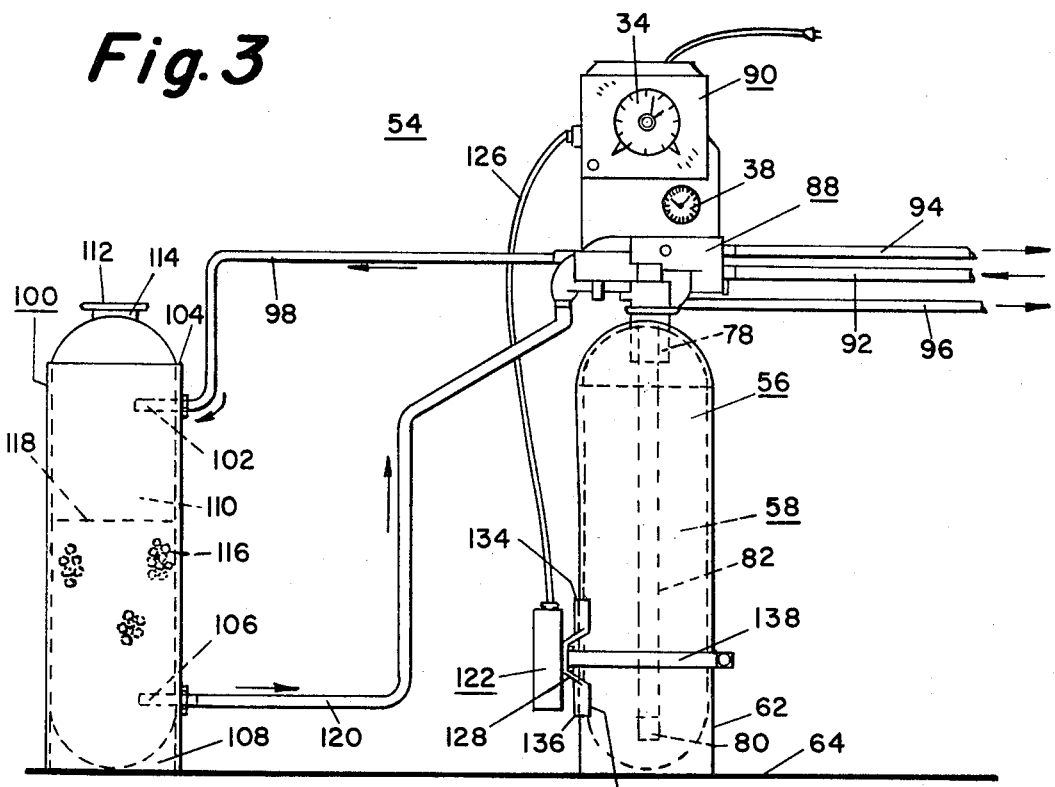

3,398,090
ION EXCHANGE WATER TREATMENT USING
VIBRATORY AGITATION
Rudy Bartell, Berwyn, and Herbert A. McKee, Wayne,
Pa., assignors to Atlantis Water Treatment Co., Inc.,
Philadelphia, Pa., a corporation of Pennsylvania
Continuation-in-part of abandoned application Ser. No.
262,529, Mar. 4, 1963. This application Oct. 20, 1965,
Ser. No. 506,424
23 Claims. (Cl. 210—19)

This is a continuation-in-part application of copending application, Ser. No. 262,529 filed Mar. 4, 1963, now abandoned, entitled, Water Processing Means and Method.

The invention relates to a method and means for processing water, and more particularly to a method and means for softening and removing impurities from water.

Heretofore, devices have been provided for reducing the hardness of water by removing impurities, such as calcium carbonate, by passing such water through a bed of ion exchange resin particles. However, such devices, upon the exhaustion of their ion exchange resins, have required extensive periods of time, in the order of an hour or more, as well as large quantities of brine solution, for the purpose of regenerating the ion exchange resin particles so they may again be useful for the purpose of reducing the hardness of the water passed therethrough. Even with such extensive periods of time and large quantities of brine solution and water for rinsing the brine solution from the ion exchange resins, such regeneration has been effective in only restoring the resin particles to a fraction of their original capacity for removing impurities.

It is therefore a principal object of the invention to provide a new and improved method and means for softening water which regenerates ion exchange resin particles within a relatively short period of time.

Another object of the invention is to provide a new and improved method and means for softening water which utilizes a reduced quantity of brine solution for regenerating its ion exchange resin particles.

Another object of the invention is to provide a new and improved method and means for softening water which regenerates in a highly efficient manner ion exchange manner ion exchange resin particles by using a minimum quantity of brine solution and rinsing water during a reduced period of time for providing a high degree of regeneration.

Another object of the invention is to provide a new and improved method and means for softening water which allows regeneration of ion exchange resin particles by automatically carrying out a series of steps over a short interval of time so as to minimize interruption of or interference in the delivery of softened water.

Another object of the invention is to provide a new and improved method and means for softening water which may be carried out by apparatus which is relatively inexpensive to produce and is highly durable, requiring a minimum of maintenance.

Another object of the invention is to provide a new and improved method and means for softening water which meets the standards of the industry and may readily be adapted to the needs of particular design requirements.

The above objects, as well as many other objects of the invention, are achieved by providing a method of processing water to reduce its hardness by removing calcium carbonate and other such impurities by utilizing a bed of particles composed of ion exchange resins, such as are well known in the art. In the normal service use, raw water which is to be softened is passed through the bed of ion exchange particles, allowing the removal of impurities, and is thereafter delivered to the service mains.

After a predetermined time when the capacity of the ion exchange particles to remove such impurities is practically exhausted, the bed of particles is regenerated.

Such regeneration takes place in the following described sequence in which raw water is delivered through the bed in the direction opposite to that in which the service water flows, providing a back wash action for a period of one minute. At the same time, the bed of ion exchange particles is subjected to vibratory agitation produced by vibratory forces having a frequency within the audible and subaudible range, resulting in actively deforming the particles by varying their volume and configuration responsive to the compression and expansion of the particles and the acceleration and deceleration of said particles produced by such vibratory forces. The particles are also caused to move by said vibratory agitation in an elliptical path within the bed. This agitation of the particles results in the removal of sediment and other such impurities by the flow of water in the backwash direction.

Immediately following the backwash operation, a brine solution is passed through the bed in the forward direction in which the service water flows, while the particles are still subjected to the vibratory agitation started during the backwash operation. The brine solution is a highly saturated salt solution and the brining process continues for one minute, after which it is followed by a rinsing operation.

The rinsing operation provides for the flow of raw water through the bed in the forward direction for a period of 15 minutes for the purpose of removing all traces of the brine solution previously passed through the bed.

During the rinsing operation, the ion exchange particles are subjected to said continued vibratory agitation for the first ten minutes, while such agitation is absent during the remaining five minutes of this operation. The removal of the vibratory agitation during the last portion of the rinsing operation has been found to allow the delivery of service water at the termination of the regenerating process with minimal traces of salt. If the vibratory agitation is continued during the entire rinsing cycle, then it has been found that the initial quantities of water processed through the bed of ion exchange particles has a higher salt content which is reduced by flow of water therethrough. Thus, the flow of water in the rinsing operation without the presence of the vibratory agitation serves to eliminate such an initial quantity of water from the service mains.

After such rinsing operation is completed, a total time of 17 minutes has elapsed for regenerating the ion exchange particles and the bed may again receive raw water for the purpose of removing impurities therefrom and for delivering softened water to the service mains.

The means for carrying out the method of the invention comprises an enclosed container means, ion exchange resin particles received within a container means providing a bed for removal of impurities from water passed therethrough, and means for passing fluids through the bed of ion exchange particles within the container means. Control means includes a valve having a first position for passing water through the bed of particles in the forward direction for removing impurities from the service water, as well as second, third and fourth positions which are used during the regeneration of the ion exchange resin particles. In the second position, the valve passes water through the bed of particles in the backward direction for removing sediment and other such impurities from the bed of particles, while in the third position, the valve passes a brine solution through the bed of particles for regenerating the resin particles. In its fourth position, the valve provides for passing water through the bed of particles in the forward direction for rinsing the brine solution from the bed of particles.

A vibratory means engages the container means for actively deforming said particles by vibration forces having a frequency within the audible and subaudible range and causing the resin particles to move in a circuitous path within the bed for regenerating the particles with the valve in its second and third positions. The vibratory means is also activated during the initial portion of the period when the valve is in its fourth position for rinsing the brine solution from the bed of particles.

The vibratory means is attached with the central portion of a mounting bracket which has a pair of spaced legs contacting the outside cylindrical wall of the container spaced in the direction of the cylindrical axis. The central portion of the bracket is secured with a band engaging the container about the cylindrical wall transverse the cylindrical axis. The vibratory means alternately applies a force to the legs of the bracket for transmitting vibratory motion to the outside cylindrical wall of the container which, in turn, induces vibratory agitation of said resin particles. The frequency at which the vibratory means applies force to the legs of the bracket is within the audible and subaudible range, for example, at a freqeuncy of 120 cycles per second.

Figure 6:
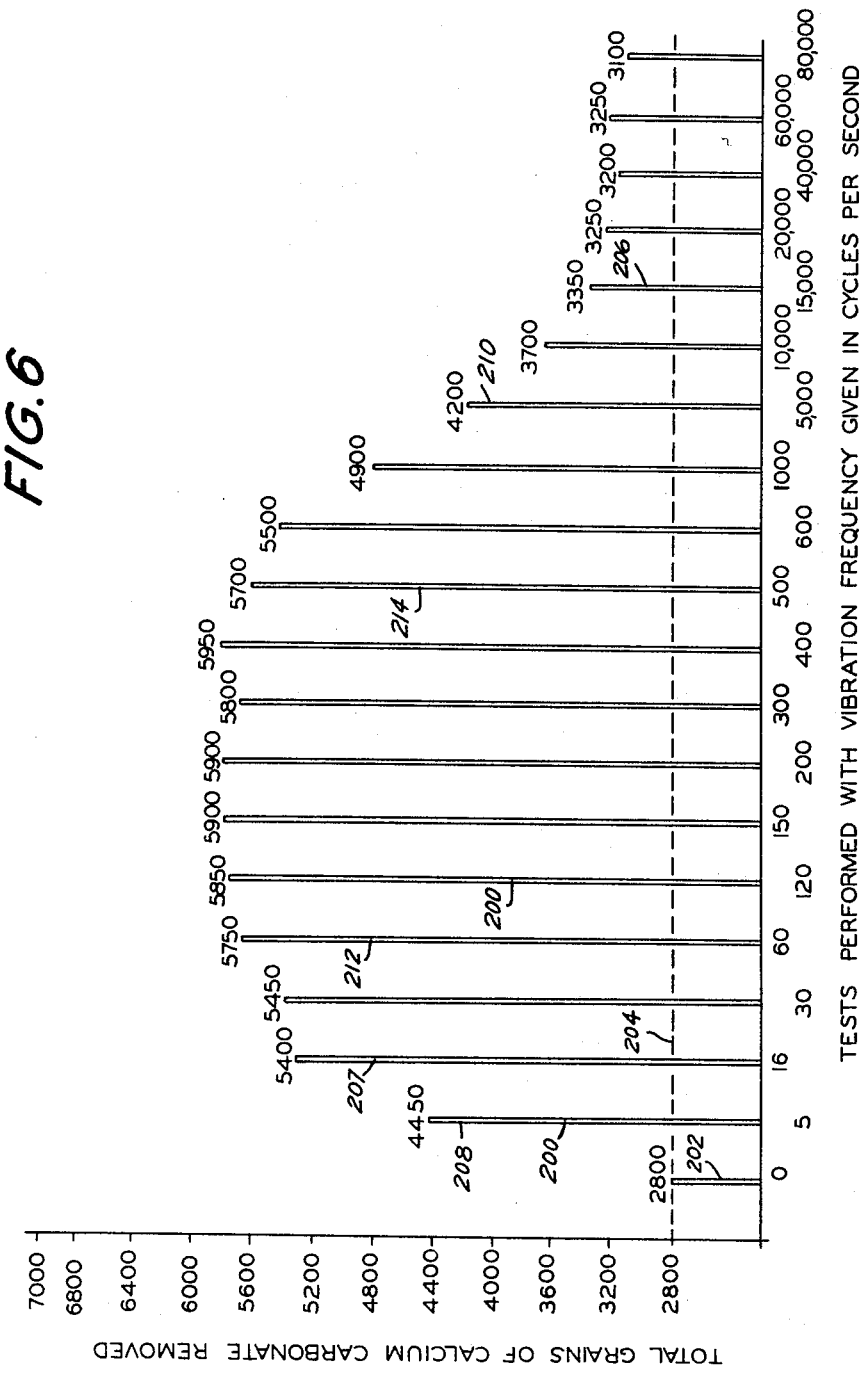

The foregoing and other objects of the invention will become more apparent as the following detailed description of the invention is read in conjunction with the drawings, in which:

FIGURE 1 is a diagrammatic representation of the steps of the method of the invention, FIGURE 2 diagrammatically represents the means for timing the steps of the method, FIGURE 3 is an elevational view of a water processing means embodying the invention and operating in accordance with the method, FIGURE 4 is an enlarged elevational view in section of the container means illustrating the circuitous path of the ion exchange particles subjected to vibratory agitation, FIGURE 5 is a graphic representation of the degree of regenerated capacity achieved by using the method and means of the invention, and FIGURE 6 is a graphic representation of the degree of regenerated capacity achieved by using the method and means of the invention when the applied vibrational agitation has various respective frequencies within the audible and subaudible range, and also when the applied vibrational agitation has various respective frequencies in the ultrasonic or supersonic range higher than the audible frequency range of the invention.

Like reference numerals designate like parts throughout the several views.

Refer to FIGURE 1 which is a diagrammatic representation of the steps of the method of the invention.

The method of the invention is applied to a bed of ion exchange resin particles through which raw water is passed to provide softened service water. The particles, after removing impurities from the raw water, become exhausted and lose this ability to remove impurities from the water.

In the method of the invention, after the ion exchange resin particles are exhausted, the particles are regenerated by a cycle which is started as indicated by the block 12 in FIGURE 1. The regeneration may be started after the ion exchange particles have been in service for a predetermined number of days as shown by the block 14, or after a given number of gallons of water processed, or any other such criterion.

With the start of the regeneration cycle, water is caused to flow in the backward or backwash direction through the bed of ion exchange particles as indicated by the block 16 for a period of one minute. At the same time, vibration is applied to the bed of ion exchange particles as shown by the block 18 and arrow 20. The backward direction is taken to be that direction which is opposite to the forward direction of water flow which occurs when service water is being provided.

Immediately following the backwash operation, a brining step is initiated having a duration of one minute as indicated at 22, during which a brine solution is passed through the bed of ion exchange particles in the forward direction. The bed is also subjected to agitation by vibration for this period as indicated by the arrow 24 extending from the block 18.

Immediately following the brining step, a rinsing operation represented by the block 26 is commenced and extends for a period of 15 minutes, during which water is passed through the bed of ion exchange particles in the forward direction. During the rinsing operation, the exchange particles are subjected to agitation by vibration for the initial ten minutes as indicated by the arrow 28 from the block 18. During the final five minutes of the rinsing operation, vibratory agitation is not applied to the bed of ion exchange particles. The absence of such vibration at this time has been found to reduce the traces of salt delivered to the service line as explained above.

It is noted that beginning with the backwash step 16, and followed by the brining and rinsing steps 22, 26, vibration having a frequency within the audible and sub-audible range is applied to the exchange particles for a total period of twelve minutes as indicated in the block 18.

Upon the completion of the rinsing step, the regeneration cycle, including the backwash, brining and rinsing operations, have been completed and this has been accomplished during a total period of 17 minutes plus such additional time which might elapse during the switching from one operation to the next. This time, of course, can be minimized by appropriate processing means which will be described in greater detail in connection with the apparatus of the invention.

With the completion of the regeneration cycle, the method provides for again passing raw water in the forward direction through the bed of ion exchange particles as indicated by the block 14, until the elapse of a predetermined number of days, after which the regeneration process is again initiated as indicated by the arrow 30 from the block 14 to the block 12. Although other means for determining the exhaustion of the particles may be utilized to start the regeneration cycle, the use of a predetermined timing cycle for regenerating the ion particles has been found most practical and such means is specifically described in connection with FIGURE 2.

FIGURE 2 provides a diagrammatic representation 32 of the control means for initiating a regeneration cycle of the invention and for timing the steps of the method.

A calendar clock 34, which may be a synchronous electric clock, is set to deliver an output signal after the elapse of a predetermined period of time set in minutes, hours and days. Thus, for example, the calendar clock may be preset to deliver a signal every other week on Thursday night at 11:30 p.m. The calendar clock may also be set to initiate a regenerating cycle every five days or after any other number of days as required. The time interval set will depend upon the period for exhausting the bed of ion exchange particles, so that regeneration will occur before the particles are completely exhausted.

The output signal from the calendar clock 34, indicated by the arrow 36 in the representation 32 of FIGURE 2, starts a secondary timer 38 for controlling and timing the steps of the regeneration cycle. The timer 38 may comprise an electric clock of the type well known in the art. The secondary timer 38, after being started by the calendar clock, initiates a regeneration cycle by energizing a motor 42 which actuates a valve 44 causing the valve to be moved from its first position indicated by the arrow 46 to its second position indicated by the arrow 48. With the valve 44 in its second position, water is passed through the bed of ion exchange resin particles in the backwash or backward direction for a period of one minute to remove sediment and other such removable impurities.

The delivery of a signal from the calendar clock to the secondary timer 38 also results in the delivery of current to the vibrator of a vibratory means indicated by the block 40 for agitating the bed of ion exchange resin particles. The secondary timer 38 times the delivery of current to the vibrator so that it is de-energized after a period of twelve minutes.

After the elapse of one minute, the secondary timer again energizes the motor 42 resulting in the valve 44 being actuated to its third position indicated by the arrow 50. In its third position, the valve causes the flow of brine solution in the forward direction through the bed of ion exchange resin particles.

After the brine solution has been flowing for a period of one minute through the bed of ion exchange particles, secondary timer 38 again energizes the motor 42 causing it to activate the valve 44 to its fourth position indicated by the arrow 52. In this position, the valve provides for the flow of raw water through the bed of ion exchange particles, which continues for a period of 15 minutes. During the initial ten minutes of this period, vibratory agitation is applied to the bed of ion exchange resin particles, while for the final five minutes such vibratory actuation is absent.

Upon the completion of the rinsing operation, the secondary timer 38 again energizes the motor 42 causing it to place the valve 44 in its first or service position shown by the arrow 46. In this position, raw water is passed in the forward direction through the bed of ion exchange resin particles which have been regenerated and now act to remove impurities from the water which is delivered to the service lines. During the backwash, brining and rinsing operations, the valve 44 delivers the water and brine solutions which pass through the bed to an exhaust outlet for disposition as waste.

Thus, in a period of approximately 17 minutes, the bed of ion exchange resin particles has been regenerated and the bed placed in condition for continued servicing of raw water by removing impurities therefrom. After a predetermined elapsed time, the calendar clock again initiates a regenerating cycle by delivering a starting signal to the secondary timer 38, repeating the above described cycle.

Refer to FIGURE 3 which is an elevational view of a water processing means 54 embodying the invention and operating in accordance with the method of the invention.

The water processing means includes a container means or tank 56 which may be made of a spun glass or other suitable material of substantially cylindrical configuration providing therewithin a substantially cylindrical chamber 58 (FIGURE 4) for receiving ion exchange resin particles 60. The bottom of the tank 62 may be supported by a horizontal surface 64 or provided with an appropriate base or support for maintaining the tank 56 in its vertical position shown in FIGURE 3.

The chamber 58 within the tank 56 may provide at its top and bottom substantially hemispherical end surfaces 66, 68, as illustrated in FIGURE 4, with the ion resin material 60 being received within most of the chamber 58 forming a bed 71 having a top surface 70 which leaves a free space 72 at the top of the chamber 58 which is not occupied by the resin particles 60.

The top portion 74 of the tank 56 is provided with an opening 76 for receiving means for passing fluid through the bed 71, comprising a top fluid distributor 78 and a bottom distributor 80 which is connected by the tube 82 passing concentrically through the top distributor 78 and the opening 76 of the tank. Thus, two separate fluid passages are provided through the opening 76 of the tank 56 for communicating by the distributor 78 with the top portion 72 of the chamber 58 and by the bottom distributor 80 with the bottom portion 84 of the chamber 58.

The distributors 78 and 80 may be of a cylindrical form and made of a nylon material provided with a plurality of openings therein for allowing the passage of fluids therethrough and preventing the passage of ion exchange resin particles 60 of the bed 71.

When raw water is to be purified, it is passed through the opening 76 of the tank 56 into the upper distributor 78 into the top portion 72 of the chamber 58 and moves downwardly traversing the surface 70 of the bed 71 of the ion exchange particles 60 towards the bottom portion 84 of the chamber 58 where it passes through the bottom distributor and then upwardly through the center connecting tube 82 and out through the opening 76 for delivery to the service lines.

The top distributor 78 and end 86 of the distributor tube 82 are connected with a valve 88. The valve 88 is provided with four positions including a service position and three regenerating cycle positions for respectively performing the operations of backwashing, brining and rinsing as described in connection with FIGURES 1 and 2. The valve 88 may be of the rotary type described in detail in Patent No. 2,245,767 to E. E. Eickmeyer et al. issued June 17, 1941, or may be of the commercially available four cycle poppet type operated by cams for positioning the valve members in proper sequence, such as that of the Great Lakes Corporation. Control means 90, including the calendar clock 34 and the secondary timer 38, actuate the valve 88 to the required positions for carrying out the various steps of the regenerating process, or the valve may be manually positioned.

When the valve 88 is in its first or service position, the raw water delivered under pressure to the valve 88, by an input line 92, is delivered to the top distributor 78 of the tank 56. After passing through the bed 71 of ion exchange particles 60, the water which has had impurities removed by this process is returned to the valve 88 through the bottom distributor 80 and connecting tube 82. The valve 88 delivers the processed or softened water to the service line 94 to supply demand as required. With the passing of raw water through the bed 71 of ion exchange particles 60, the ion exchange particles 60 continue to remove impurities from the water. This continually reduces the capacity and ability of the exchange resin particles 60 to remove impurities until they are exhausted. A material which is suitable for use as ion exchange resin particles 60 is produced by Rohm & Haas Company and commercially known as Amberlite IR-120. This is the material which has been utilized for providing the bed within the tank 56 and for which test figures are provided herein. Of course, the invention is not limited to this particular type of ion exchange resin particles, but may utilize other such suitable materials.

The control means 90 has its calendar clock 34 set to initiate a regeneration cycle before the exhaustion of the bed of ion exchange particles 60, so that water in suitably purified or softened form is delivered to the service line 94. At the appropriate time, the calendar clock 34 energizes the secondary timer 38, resulting in the actuation of the valve 88 to its second position for carrying out the backwash operation. At this time, the raw water received under pressure from line 92 is passed by the valve 88 through the distributor line 82 to the bottom distributor 80 resulting in the upward passage of water through the bed 71 of ion exchange particles to the top distributor 78 which delivers the water back to the valve 88. The valve 88 passes the water received from the top distributor 78, together with such sediment and other impurities flushed out of the tank 56 by this operation, to the drain line 96 for disposition as waste. The backwash is, thus, not delivered to the service line 94 during the backwash operation, nor is brine or water which is passed through the bed during the brining and rinsing operations which follow thereafter delivered to the service line 94. Thus, the short time for carrying out the regeneration cycle is of utmost importance for placing the water processing means 54 back in condition for providing purified water to the service line 94.

After the valve 88 has allowed the backwash operation to continue for one minute, it is again actuated by the control means 90 to assume its third position, at which time it delivers water under pressure from the input line 92 to the input line 98 of a brine tank 100. The brine tank 100 has an input distributor 102 at its top 104 and an output distributor 106 at its bottom 108. The brine tank 100 may have a similar construction to the tank 56 being of substantially cylindrical form and providing a cylindrical cavity 110 therewithin. The tank 100 is supported in its vertical upright position shown in FIGURE 3 and has a cap 112 at its top enclosing an opening 114 at its top communicating with the cavity 110. Salt pellets 116 are received through the opening 114 up to a predetermined level 118 and additional salt pellets are added from time to time to substantially maintain this level as pellets are dissolved with the formation of brine.

Water is received into and occupies the space within the cavity 110 of the tank 100 not occupied by the salt pellets 116. The salt pellets, thus, dissolve to provide a saturated salt solution within the cavity 110 of the tank 100.

When the water is received into the top of the cavity 110 through the distributor 102 from the input line 98, saturated salt solution or brine is forced out through the bottom distributor 106 into the brine tank output line 120. The brine solution passes through the line 120 into the valve 88. The valve 88 directs the brine solution into the top of the chamber 58 of the tank 56 through the distributor 78. The brine solution moves downwardly across the top surface 70 of the bed 71 of ion exchange particles 60 towards the bottom portion 84 of the chamber 58 where it passes through the distributor 80. Upon reaching the bottom 84 of the chamber 58 of the tank 56, the brine solution passes through the distributor 80 and is returned by a center connecting tube 82 to the valve 88. From the valve 88, the brine solution is delivered to the drain line 96 for disposal as waste.

After a period of one minute, during which the brining operation takes place, the valve 99 is actuated by the control means 90 to assume its fourth position. In the fourth position of the valve 88, the rinsing operation takes place. The rinsing operation continues for a period of 15 minutes.

With the valve 88 in its fourth position, rinsing of the ion exchange bed 71 takes place by the delivery of raw water to the top distributor 78 of the tank 56 from the water inlet line 92 through the valve 88. The water which is received into the chamber 58 of the tank 56 through the top distributor 78 passes downwardly through the bed 71 toward the bottom portion 84 of the chamber 58. At the bottom portion 84 of the chamber 58, the bottom distributor 80 receives therethrough the rinse water which has passed through the bed 71 and delivers same through the center connecting tube 82 to the valve 88 for disposition as waste through the drain line 96.

After the rinsing operation has been completed, the secondary timer 38 of the control means 90 causes the actuation of the valve 88 to its first position. The first position is the service position assumed after the regeneration cycle in which the valve is set for delivering raw water through the regenerated bed 71 of ion exchange particles 60 for delivery of softened water to the service line 94.

With the initiation of a regeneration cycle by the calendar clock 34 of the control means 90, a vibratory means 122 is energized by the control means 90 and its energization continues through the backwash and brining operations and also the initial ten minutes of the rinsing operation.

The vibratory means 122 may be of the type energized by 60 cycle alternating current for producing vibrations having a frequency of 120 cycles per second. The vibratory means 122 may preferably be similar to the electromagnetic reciprocating type disclosed in Patents No. 2,836,940 and No. 2,878,404. The vibratory means which is received within a substantially rectangular housing or casing 124 is electrically connected by a cable 126 with the control means 90 and is externally mounted by a bracket 128 along the bottom outer region 130 of the tank 56.

The casing 124 is supported in substantially vertical position by being connected to the central portion 132 of the bracket 128, while the bracket is provided with a pair of spaced legs 134, 136 contacting the outside cylindrical wall of the tank 56 vertically spaced one above the other. The central portion 132 of the bracket 128 is secured with a horizontally extending bank 138 engaging the outside wall of the tank 56. The vibratory means 122 provides a vibration having a frequency of 120 cycles per second in the horizontal direction indicated by the arrows 140 which are imparted to the legs 134, 136 of the bracket 128 shown by the arrows 146, 148. The vibratory forces received by the legs 134, 136 are imparted to their contact surfaces of the tank 56, the vibrations being transmitted by the leg 134 being 180° out of phase with the vibrations delivered to the surface of the tank 56 by lower leg 136.

The vibratory means 122 with its mounting bracket 128, when energized, results in inducing vibratory agitation in the bed 71 of ion exchange particles 60 within the chamber 58 of the tank 56. Such vibratory agitation of the particles was found to be effectively induced when the mounting bracket 128 was positioned a distance approximately 10 inches from the bottom of the tank 56 which had a total height of 28 inches. As shown in FIGURE 4, the legs 134, 136 of the bracket 128, which are made of spring steel, extend respectively in the upward and downward directions approximately 7½" from their central connecting portion 132. The band 138 for securing the bracket 128 was made of 1 inch wide steel strip of $\frac{1}{16}$ inch thickness. The tank 56 to which the clamp 128 and band 138 were secured was made of Fiberglas material of approximately $\frac{3}{16}$ inch thickness having an 8¼ inch outside diameter and a chamber with a volume of approximately .75 cubic feet.

When the tank 56 and the vibratory means 122 mounted by the bracket 128, as described above, had current supplied to the vibratory means 122, the ion exchange particles 60 within the bed 71 of the tank 56 moved in circuitious paths 139, 141 generally illustrated by the arrows 140, 142 of FIGURE 4. The particles in the left section of the chamber 58 move along the paths 139, while the particles in the right section circulate in the paths 141. Thus, the particles 60 in path 139, indicated by the arrow 140, move downwardly upon reaching the bottom portion 84 of the chamber 58 proximate to the central connecting tube 82 to complete the circuit. The path 141 shown by the arrows 142 made by the particles 60 in the right band portion of the chamber 58 away from the vibratory means 122, extends upwardly proximate the right wall portion 146 toward the top surface 70 of the bed 71 after which the particles move downwardly proximate the central connecting tube 82 to the bottom portion 84 of the chamber 58 of the tank 56 to complete the circuit.

At the same time that the particles 60 move in circuitous paths, each particle also vibrates in a back and forth direction about a mean position resulting in the acceleration and deceleration of the particles 60. Such acceleration and deceleration of the particles 60 result in their deformation by change in volume and contour. Variations in fluid pressure about said particles due to the vibratory forces also compress and expand said particles. This results in the "breathing" of each of the particles, increasing its internal contact with the solution in which it is immersed. Although the above dimensions of the tank 56 and the mounting bracket 128 and band 138 have been specified, since same provide the conditions for producing the vibration and circulation of the ion exchange particles within the bed 71, as described in FIGURE 4, other mounting means and tanks of different construction and dimensions may also be provided by those skilled in the art to produce satisfactory results. It has been found, however, that not all mounting means and their arrangement with a tank will produce the desired results described in connection with FIGURE 4.

It is important to note that the vibratory means 122 provides a vibratory motion in the direction shown by the arrows 144, so that vibratory forces, as indicated by arrows 146, 148, are exerted in out-of-phase relationship on the legs 134, 136 of the bracket 128 for transmission as a pressure perpendicular to the surfaces of the tank 56 contacted by the legs of the bracket 128. In this connection, it is noted that the vibratory means 122, to accomplish this result, provides a torque force to the central connecting portion 132 of the bracket 128 about an axis perpendicular to the plane of FIGURE 4.

The vibratory distortion and circulation of the ion exchange particles 60 in the bed 71 of the tank 56, when provided during the backwash, brining and rinsing operations as described above, result in a regeneration cycle which produces highly desirable and unexpected results which will be explained below in connection with performance data obtained for the embodiment of the device described herein.

In this connection, it is noted that the energization of the vibratory means 122 during the backwash operation facilitates the loosening and removal of extraneous sediment and other such material from the tank before any brining operation.

During the brining operation, the "breathing" of the particles due to their vibration and deformation increases the contact of the particles with the brine solution, greatly accelerating the exchange reaction for rejuvenating the ion exchange particles 60. The circulation of the particles within the bed 71 also breaks up any channeling which may have occurred within the bed 71 during the service use of the equipment for purifying water and allows the equal exposure of the particles to the brine solution to obtain more uniform results within a shorter period of time and with use of a smaller qantity of brine solution.

The continued circulation of the particles and distortion by vibratory agitation has similar highly unexpected and desirable results during the rinsing operation, allowing the brine to be more quickly removed with the use of a smaller quantity of rinse water than when the vibratory means 122 is not utilized. The last portion of the rinsing operation is completed without the energization of the vibratory means 122 for minimizing salt content delivered to the service line as previously explained.

FIGURE 5 is a graphic representation illustrating the regenerated capacities for removing impurities from raw water by using the method and means of the invention.

The abscissa of the graph gives the total grains of calcium carbonate removed, while the ordinate shows the gallons of water processed. The tests from which the data was derived to provide the graph were conducted with the use of the equipment described herein, using raw water having a hardness of 8.5 grains per gallon and under a pressure of approximately 61 pounds per square inch. During each regeneration, one pound of salt was used during the brining step at 100 percent saturation in a total volume of brine solution of .4 gallon. The rinsing time was 15 minutes and utilized 7.5 gallons of raw water flowing at the rate of .5 gallon per minute. The total time for the regeneration cycle was 19 minutes, taking into account the time for setting the valve 88 to its several positions during the steps of the cycle.

The three tests carried out and designated on the graph by the solid curves 1, 2 and 3 were after the bed 71 was regenerated in accordance with the invention, in which the vibratory means 122 provides vibrations having a frequency of 120 cycles per second, was activated during the backwash, brining, and the initial ten minutes of the rinsing step. The curves of the graph 1, 2 and 3, thus, indicate the effectiveness of the invention in regenerating the bed 71 of ion exchange particles 60 within the tank 56 after the particles have been exhausted.

The manner of determining the capacity to remove impurities by the regenerated bed 71 of ion exchange particles 60 for preparing the curves of FIGURE 5, comprises placing the apparatus 54 with its valve 88 in the service position and permitting raw water from the line 92 having an average hardness of 8.5 grains per gallon to flow in the normal manner through the bed 71 of ion exchange particles and out through the service line 94 at the rate of eight gallons per minute. The content in grains per gallon of calcium carbonate in the processed water delivered to the service line 94 from the tank 56 was tested at appropriate intervals, such as after the measured flow of 50 to 100 gallons of water through the bed 71 of ion exchange particles 60. From this information, the number of grains removed by the bed 71 of ion exchange particles can be determined during each such interval. The graph 5 shows the total grains of calcium carbonate removed for the total water processed through the tank 56. It is noted that the curves 1, 2 and 3 are substantially linear and have a slope which decreases when 600 and 700 gallons of water have been processed therethrough. Each test was concluded when the grains of calcium carbonate in the processed water was within plus or minus ten percent of one grain per gallon. Thus, for the purpose of the tests, the bed 71 of ion exchange particles was considered exhausted when water delivered therethrough contained approximately one grain per gallon of calcium carbonate.

The identical tests were repeated to obtain the three curves 4, 5 and 6 shown by the dashed lines in FIGURE 5, except that the vibratory means 122 was not actuated at any time during the regeneration cycles for these tests. In order to obtain curves 4, 5 and 6, water with the same hardness of 8.5 grains per gallon of calcium carbonate was passed through the bed 71 of ion exchange particles. The tests were concluded upon the delivery of water to the service line 94 having a hardness of 1.1 grain per gallon of calcium carbonate. As seen from the curves 4, 5 and 6 of FIGURE 5, the tests were ended after the processing of between 360 and 485 gallons of raw water of the stated hardness.

Comparing the results achieved with the operation of the device 54 embodying the invention and the use of the identical apparatus without vibration provides different and unexpected results. The use of the apparatus of the invention provided a regeneration cycle in which the bed 71 of ion exchange particles 60 were regenerated to a capacity where approximately 6,000 grains were removed before exhaustion. On the other hand, the use of the apparatus 54, as described, without energization of the vibratory means 122 allowed the regenerated bed 71 of ion exchange particles to remove only 3,000 to 4,000 grains of calcium carbonate before exhaustion of the bed 71. From this, it appears that the regeneration cycle of the invention provides the regenerated bed 71 of ion exchange particles with approximately twice the capacity to remove calcium carbonate from the raw water. This is accomplished in a total time of approximately 19 minutes.

Thus, in operation, the device 54, using the method of the invention, can process approximately twice the amount of water before regeneration of its bed 71 is required, as compared to prior art devices which do not utilize the method of the invention. As will also be shown below, the method of the invention requires less salt during the brining operation and a smaller quantity of rinsing water to obtain regeneration of its bed 71 of ion exchange particles with a capacity equal to or greater than that achieved by the device 54 when not employing the vibratory means 122. The regeneration, using the method of the invention, is also completed in a fraction of the time otherwise required and consumes a smaller quantity of salt.

The water processing means 54 for carrying out the first of the two tests to be described was provided with raw water having an average hardness of 5.7 grains per gallon and was delivered at a pressure of approximately 42 pounds per square inch. A resin bed of .6 cubic feet of Amberlite IR–120 was used.

The backwash step and the brining step each respectively had a duration of one minute, while the rinse operation was carried out for eleven minutes. The brining step of the regeneration cycle used 1.3 pounds of salt in a 100 percent saturated brine solution of one-half gallon. The backwash and brining operations, as well as the first five minutes of the rinsing step, took place during the energization of the vibratory means 122. The rinsing consumed 5.5 gallons of water flowing at the rate of one-half gallon per minute.

After the completion of the regeneration cycle, water with an average hardness of 5.7 was passed through the bed 71 of ion exchange particles until a point was reached where the purified water contained a hardness of one grain per gallon. At this time, the test was stopped. The bed 71 of ion exchange particles at the completion of this test, removed 8,265 grains with the flow of 1,450 gallons of water through the bed.

For the purpose of equalling or approximating this capacity, the second test was performed in which the water processing means 54 was utilized without the energization of the vibratory means 122 during the regeneration cycle, under the following conditions. Raw water was utilized for the test having a hardness of 5.7 grains per gallon and at a pressure of 42 pounds per square inch, identical to that of the first test. The bed 71 of ion exchange particles were also Amberlite IR–120 and had a volume of .6 cubic feet as in the first test above.

The backwash step was carried out over a period of ten minutes, while the brining operation followed for 22 minutes. The rinse step was next carried out for 48 minutes. During the brining step, 4.2 pounds of salt were used to provide 100 percent saturated brine solution of 1.7 gallons. The rinse operation was carried out with water flowing at two gallons per minute consuming 96 gallons of water.

To determine the capacity of the bed 71 of ion exchange particles 60 to remove calcium carbonate from raw water, raw water having a hardness of 5.7 grains per gallon was passed through the regenerated bed 71. As was done during the first test, the grains per gallon of calcium carbonate remaining in the processed water was determined at different intervals during the exhaustion process for determining the grains of calcium carbonate removed from the raw water. This allowed the calculation of the total grains of calcium carbonate removed from the processed water.

After a flow of 1,325 gallons of water, the processed water contained one grain per gallon of calcium carbonate indicating that the bed 71 of ion exchange particles was exhausted for the test purposes. At this time, a total of 7,553 grains of calcium carbonate had been removed from 1,325 gallons of water which had been processed by the apparatus.

In comparing the results of the above first and second tests, it is evident that the regeneration cycle of the invention was carried out in less than one-fifth the time required for the second test, that is, 14 minutes for the first test and 80 minutes for the second test. The first test required less than one-third the salt to obtain regeneration of its bed when compared to the second test, the figures being 1.3 pounds of salt for the first test and 4.2 pounds of salt for the second test. The first test used less than one-seventeenth of the rinse water consumed during the second test, the quantities being 5.5 gallons of water for the first test and 90 gallons for the second test. Even with the greater time required and the increased salt and rinse water used during the second test, the regeneration of the bed using the invention still provided a greater regenerated capacity as shown by the first test. The amount of water processed, of course, was also correspondingly greater for the first test, in view of the increased regenerated capacity, since the hardness of the water used in both tests was identical.

The significance of the first and second tests, thus, shows that the regeneration of the bed 71 of ion exchange particles without the use of the vibratory means 122 took more than five times as long and required more than three times as much salt and seventeen times the quantity of rinse water to produce a regenerated capacity to remove impurities, which capacity was still less than that provided by the method of the invention. The method of the invention and the apparatus 54 for carrying out the method, thus, produces unexpected and highly desirable results which cannot be duplicated by the prior art devices with regard to the amount of time or salt required to regenerate the bed 71 of ion exchange particles 60. The factors of improvement in using the method of the invention are manifold as shown by the test data provided and provide results greatly superior to and unattainable by the prior art devices.

Since the regeneration cycle of the invention may be carried out over a reduced period of time, the interruption in the use of the water processing means 54 for delivering processed or softened water to the service lines is minimized. The requirement of a smaller quantity of salt also increases the economy of the means 54, as well as the requirement for servicing and replacing the supply of salt used by the means 54 over a period of time. The reduced amount of water required for the backwash, brining and rinsing operations also minimizes waste of water which may be of significance in locations having a minimal water supply.

FIGURE 6 is a graphic representation of the degree of regenerated capacity achieved by using the method and means of the invention when the applied vibratory agitation has various respective frequencies within the audible and subaudible range. FIGURE 6 also illustrates the regenerated capacity when the vibratory agitation has various respective frequencies in the ultrasonic or supersonic range higher than the audible frequency range of the invention.

The tests made to provide the results illustrated by FIGURE 6 were conducted under similar conditions and using equipment identical to that providing the results illustrated in FIGURE 5, except where tests were made in the ultrasonic frequency range of vibrations, in which cases special transducers were required and utilized. In the cases where such special ultrasonic transducers were utilized extensive preliminary tests were conducted to determine the best way of mounting such transducers before the tests providing the results shown in FIGURE 6 were conducted.

The abscissa of the graphic representation of FIGURE 6 gives the total grains of calcium carbonate removed, while each of the vertical columns 200 represents a test performed with the apparatus and method utilizing a vibratory agitation having the frequency given at the bottom of the column in cycles per second. The height of each column 200 represents the total grains of calcium carbonate removed for the particular test for the vibratory frequency shown. The columns 200 illustrating the tests are arranged at equally spaced intervals with the vibratory frequency utilized increasing from left to right along the ordinate direction. The first column 202 illustrates a total of 2800 grains of calcium carbonate removed for the test performed without the application of vibratory agitation. The dashed line 204 extends horizontally and illustrates this level with respect to the remaining columns 200, representing other tests for various frequencies of agitation.

The audible and subaudible range of frequencies for the vibratory agitation applied in the method and carried out by the apparatus of the invention is generally considered to include the range of frequencies below and extending up to 15,000 cycles per second. Thus, the test represented by the bar of column 206, in which the frequency of vibratory agitation is shown to be 15,000 cycles per second, represents the upper limit of the audible range of frequencies, and above which extends the ultrasonic or supersonic range of frequencies. The ultrasonic and supersonic range of frequencies for vibratory agitation is outside the range of frequencies applied by the method of the invention and the apparatus carrying out the method. Within the applicable range of frequencies, the subaudible range is divided from the audible range at the frequency of 15 cycles per second. A test taken at approximately this frequency, namely 16 cycles per second, for the vibratory agitation is illustrated by the vertical bar 207. The subaudible range of frequencies extend below the frequency of 15 cycles per second, while the audible range of frequency extends from 15 cycles per second up to 15,000 cycles per second.

The test result shown by the bar 202, when no vibratory agitation is applied shows that a total of 2800 grains of calcium carbonate is removed. It is noted that an unexpected and highly desirable result is achieved within the subaudible and audible range of frequencies for the vibratory agitation, employed during the carrying out of the method and the apparatus of the invention, within the frequency range of the invention. Thus, at a frequency of 400 cycles per second a high point is achieved of 5950 total grains of calcium carbonate removed, while for tests taken at 150 and 200 cycles per second for the vibratory agitation, total grains of calcium carbonate removed of 5900 were achieved. The FIGURE 6 also illustrates that for the tests shown by columns 212 and 214 and columns therebetween for the frequency range of approximately 50 to 500 cycles per second, 5700 total grains of calcium carbonate or more were removed for each test, compared with 2800 total grains of calcium carbonate removed when no vibratory agitation is applied. In the range of subaudible and audible frequencies between 5 and 5000 cycles per second, the tests exemplified by the columns 208 and 210 and those therebetween show the total grains of calcium carbonate removed for each test is 4200 or more.

At the upper limit of the audible frequency range, the test illustrated by bar 206 shows the removal of 3350 total grains of calcium carbonate. However, for tests which extend from this frequency up to 80,000 cycles per second in the supersonic or ultrasonic range, the total grains of calcium carbonate removed was 3250, or less, thus approaching the total grains removed of 2800 corresponding to the case where no vibratory agitation was applied. It thus appears, that the unexpected and advantageous results achieved by the method and apparatus of the invention are limited to the application of vibratory agitation having a frequency within the audible and subaudible range. When no vibratory agitation is applied or vibratory agitations extending beyond the audible range are utilized, results are achieved which in no way compare with the unexpected and high rate of total grains of calcium carbonate removed by regeneration obtained within the frequency range of the invention.

It was also observed that in the high frequency range extending upwardly from 5,000 cycles per second, when resin ion exchange particles Amberlite IR–120 was utilized in a mixed bed including particles of larger and smaller diameter, the application of such high frequency or ultrasonic vibration had the effect of causing breakdown of the bead structures of larger diameter. It was estimated that by the use of such frequencies beyond 5,000 cycles per second, there would result a deterioration or loss of approximately 15 percent of the resin bed per year in which regeneration cycle occurred approximately once per week. No such breakdown in the ion exchange particles was noted for the use of vibratory agitation below 5,000 cycles per second. Thus, there is an advantage in utilizing vibratory agitation with a frequency below 5,000 cycles per second in order to minimize damage to the ion exchange particles and maximize the life of the ion exchange bed of the apparatus.

It will be obvious to those skilled in the art that the invention may find wide application without substantial departure from the essence of the invention.

What is claimed is:

1. The method of processing water utilizing a bed of ion exchange particles comprising the steps of:
    (a) passing water in the forward direction through a bed of ion exchange particles confined within a container for removing impurities from said water, and
    (b) periodically passing water through said bed of exchange particles in the backwash direction and subjecting said particles to vibratory agitation having a frequency within the audible and subaudible range for regenerating said bed of particles.

2. The method of processing water utilizing a bed of ion exchange particles comprising the steps of:
    (a) passing water in the forward direction through a bed of ion exchange particles confined within a container for removing impurities from said water, and
    (b) periodically passing a brine solution through said bed of exchange particles while subjecting said particles to vibratory agitation having a frequency within the audible and subaudible range for regenerating said bed of particles.

3. The method of processing water utilizing a bed of ion exchange particles comprising the steps of:
    (a) passing water through a bed of ion exchange particles confined within a container for removing impurities from said water, and
    (b) periodically regenerating said particles by (1) passing water through said bed of exchange particles in the backwash direction while subjecting said particles to vibratory agitation having a frequency within the audible and subaudible range, and (2) passing a brine solution through said bed of exchange particles while subjecting said particles to said vibratory agitation.

4. The method of 3 in which in step (b) said particles are subjected to vibratory agitation having a frequency in the range of 5 to 5,000 cycles per second.

5. The method of claim 3 in which in step (b) said particles are subjected to vibratory agitation having a frequency in the range of 50 to 500 cycles per second.

6. The method of processing water utilizing a bed of ion exchange particles comprising the steps of:
    (a) passing water through said bed of ion exchange particles confined within a container for removing impurities from said water, and
    (b) periodically regenerating said bed of particles by successively (1) passing water through said bed in the backwash direction, (2) passing a brine solution through said bed of exchange particles, (3) rinsing said particles by passing water through said bed of particles, and (4) subjecting said particles to vibratory agitation having a frequency within the audible and subaudible range during steps (1), (2) and (3), and
    (c) proceeding with step (a) supra.

7. The method of processing water utilizing a bed of ion exchange particles comprising the steps of:
    (a) passing water in the forward direction through a bed of ion exchange particles confined within a container for removing impurities from said water, and
    (b) periodically passing water through said bed of exchange particles in the backwash direction and actively deforming said particles by vibration having a frequency within the audible and subaudible range and causing said particles to move in a circuitous path within said bed.

8. The method of processing water utilizing a bed of ion exchange particles comprising the steps of:
   (a) passing water in a forward direction through a bed of ion exchange particles confined within a container for removing impurities from said water, and
   (b) periodically passing a brine solution through said bed of exchange particles while actively deforming said particles by vibration having a frequency within the audible and subaudible range and causing said particles to move in a circuitous path within said bed for regenerating said bed of particles.

9. The method of processing water utilizing a bed of ion exchange particles comprising the steps of:
   (a) passing water through a bed of exchange particles confined within a container for removing impurities from said water, and
   (b) periodically regenerating said particles by (1) passing water through said bed of exchange particles in the backwash direction while actively deforming said particles by vibration having a frequency within the audible and subaudible range and causing said particles to move in a circuitous path within said bed, and then (2) passing a brine solution through said bed of exchange particles while vibrationally deforming said particles and causing said particles to move in a circuitous path.

10. The method of processing water utilizing a bed of ion exchange particles comprising the steps of:
    (a) passing water through a bed of ion exchange of particles confined within a container for removing impurities from said water, and
    (b) periodically regenerating said bed of particles by successively (1) passing water through said bed in the backwash direction, (2) passing a brine solution through said bed of exchange particles, (3) rinsing said particles by passing water through said bed of particles, and (4) actively deforming said particles by vibration having a frequency within the audible and subaudible range and causing said particles to move in a circuitous path within said bed during steps (1), (2) and (3), and
    (c) proceeding with step (a) above.

11. The method of regenerating ion exchange particles used for removing impurities from water comprising:
    (a) passing water through a bed of ion exchange particles confined to and filling a volume bounded by the side and bottom walls of a container for regenerating said particles, and
    (b) subjecting said particles to vibratory agitation having a frequency within the audible and subaudible range.

12. The method of regenerating ion exchange particles used for removing impurities from water comprising:
    (a) passing a brine solution through a bed of ion exchange particles confined to and filling a volume bounded by the side and bottom walls of a container, and
    (b) subjecting said particles to vibratory agitation having a frequency within the audible and subaudible range.

13. The method of regenerating ion exchange particles used for removing impurities from water comprising the steps of:
    (a) passing water in the backward direction through said bed of exchange particles confined to and filling a volume bounded by the side and bottom walls of a container while subjecting said particles to vibratory agitation having a frequency within the audible and subaudible range, and
    (b) passing a brine solution through said bed of particles while subjecting said particles to vibratory agitation having a frequency within the audible and subaudible range.

14. The method of claim 13 including following step (b) by:
    (c) rinsing said particles by passing water through said bed of particles while subjecting said particles to vibratory agitation having a frequency within the audible and subaudible range.

15. The method of regenerating ion exchange particles used for removing impurities from water comprising:
    (a) passing water through a bed of ion exchange particles confined to and filling a volume bounded by the side and the bottom walls of a container for regenerating said particles, and
    (b) actively deforming said particles by vibration having a frequency within the audible and subaudible range and causing said particles to move continuously in a circuitous path within said bed.

16. The method of regenerating ion exchange particles used for removing impurities from water comprising:
    (a) passing a brine solution through a bed of ion exchange particles confined to and filling a volume bounded by the side and bottom walls of a container, and
    (b) actively deforming said particles by vibration having a frequency within the audible and subaudible range and causing said particles to move in a continuous circuitous path.

17. The method of regenerating ion exchange particles used in removing impurities from water comprising:
    (a) passing water in the backward direction through said bed of exchange particles confined within a container while actively deforming said particles by vibration having a frequency within the audible and subaudible range and causing said particles to move in a circuitous path within said bed, and
    (b) passing a brine solution through said bed of particles confined within said container while actively deforming said particles by vibration having a frequency within the audible and subaudible range and causing said particles to move in a continuous circuitous path within said bed.

18. The method of claim 17 including following step (b) by:
    (c) rinsing said particles by passing water through said bed of particles confined within said container while actively deforming said particles by vibration having a frequency within the audible and subaudible range and causing said particles to move in continuous circuitous path within said bed.

19. The method of claim 18 including following step (c) by:
    (d) rinsing said particles by passing water through said bed of particles confined within said container in the absence of actively deforming said particles by vibration having a frequency in the audible and subaudible range or causing said particles to move in a circuitous path within said bed.

20. Water processing means comprising enclosed container means; ion exchange particles received within said container means providing a bed for removing impurities from water passed therethrough; means for passing fluids through the bed of ion exchange particles within said container means; control means including a fluid valve having a first position for passing water through said bed of particles in the forward direction for removing impurities from said water, a second position for passing fluid through said bed of particles in the backward direction for removing impurities from said bed of particles, and a third position for passing a brine solution through said bed of particles for regenerating said bed of particles; and vibratory means engaging said container means for actively deforming said particles by vibration having a frequency within the audible and subaudible range and causing said particles to move in a circuitous path within said bed for regenerating said particles when said valve is in either its second or third positions.

21. The means of claim 20 in which said control means includes timing means for placing said valve in its first position for purifying water and periodically regenerating said bed of particles by placing said valve successively in its second and third positions for predetermined periods and causing the energization of said vibratory means only when said valve is in its second and third positions.

22. The means of claim 20 in which said valve has a fourth position for passing water through said bed of particles in the forward direction for rinsing the brine solution from said bed of particles; and said control means includes timing means for placing said valve in its first position for purifying water and periodically regenerating said bed of particles by placing said valve successively in its second, third and fourth positions for predetermined periods and causing the energization of said vibratory means only when said valve is in its second, third and fourth positions.

23. The means of claim 22 in which said control means only allows the energization of said vibratory means during an initial portion of the period during which said valve is in its fourth position.

References Cited

UNITED STATES PATENTS

| | | | |
|---|---|---|---|
| 2,052,515 | 8/1936 | Pick | 210—35 |
| 3,208,476 | 9/1965 | Clack | 210—35 X |
| 2,514,471 | 7/1950 | Calhoun | 18—8 |

FOREIGN PATENTS

| | | |
|---|---|---|
| 1,602,324 | 7/1960 | Canada. |
| 824,831 | 12/1959 | Great Britain. |

REUBEN FRIEDMAN, *Primary Examiner.*

F. SPEAR, *Assistant Examiner.*